(12) United States Patent
Katz

(10) Patent No.: US 12,253,614 B2
(45) Date of Patent: Mar. 18, 2025

(54) TRACKING A RADIO BEACON INDOOR

(71) Applicant: Daniel A. Katz, Kiryat Ono, IL (US)

(72) Inventor: Daniel A. Katz, Kiryat Ono, IL (US)

(*) Notice: Subject to any disclaimer, the term of this patent is extended or adjusted under 35 U.S.C. 154(b) by 361 days.

(21) Appl. No.: 17/972,716

(22) Filed: Oct. 25, 2022

(65) Prior Publication Data
US 2024/0183929 A1    Jun. 6, 2024

(51) Int. Cl.
*G01S 5/02* (2010.01)
*G01S 5/06* (2006.01)
*G01S 5/14* (2006.01)

(52) U.S. Cl.
CPC .......... *G01S 5/0249* (2020.05); *G01S 5/0231* (2013.01); *G01S 5/02585* (2020.05); *G01S 5/06* (2013.01); *G01S 5/14* (2013.01)

(58) Field of Classification Search
CPC .. G01S 5/0231; G01S 5/0249; G01S 5/02585; G01S 5/06; G01S 5/12; G01S 5/14
See application file for complete search history.

(56) References Cited

U.S. PATENT DOCUMENTS

| | | | | |
|---|---|---|---|---|
| 6,429,814 B1 * | 8/2002 | van Diggelen | ......... | G01S 19/50 |
| | | | | 342/357.33 |
| 6,430,498 B1 * | 8/2002 | Maruyama | ............. | G01C 21/20 |
| | | | | 701/526 |
| 8,049,668 B1 * | 11/2011 | Gines | .................... | G01S 5/0278 |
| | | | | 342/465 |
| 2006/0205417 A1 * | 9/2006 | Ju | .......................... | G01S 5/0252 |
| | | | | 455/456.1 |
| 2016/0054425 A1 * | 2/2016 | Katz | ..................... | G01S 5/0249 |
| | | | | 342/417 |
| 2024/0112131 A1 * | 4/2024 | Johnson | .................... | G01S 5/16 |

FOREIGN PATENT DOCUMENTS

EP       3457164 A1 *  3/2019

OTHER PUBLICATIONS

M.N.O. Sadiku, Elements of Electromagnetics, 3rd Edition, Oxford University Press, p. 28-52 (Year: 2000).*
K. Ren, What You Need to Know About Periodic Advertising Sync Transfer, https://www.bluetooth.com/blog/periodic-advertising-sync-transfer/ (Year: 2019).*

* cited by examiner

*Primary Examiner* — Bernarr E Gregory
*Assistant Examiner* — Fred H Mull

(57) ABSTRACT

A method and devices are disclosed, for tracking a radio beacon at a mobile device, using short range RF signals, emitted by the beacon and detected at the mobile device, typically indoor, requiring no GNSS service. According to the disclosed method, the beacon is configured to broadcast short bursts, at a carefully structured difference in time of emission (DTOE), while at the tracking device, the difference in time of arrival (DTOA) of said signals is measured, and along with the DTOE, used to accurately determine the location of and direction to the beacon relatively to the tracking device. According to a preferred embodiment of the present invention, said short range RF signals are associated with Bluetooth advertising, configured to broadcast in 1-way, requiring no pairing and no connection from the tracking device, and practically not requiring a receiver at the beacon, therefor saving battery energy.

20 Claims, 10 Drawing Sheets

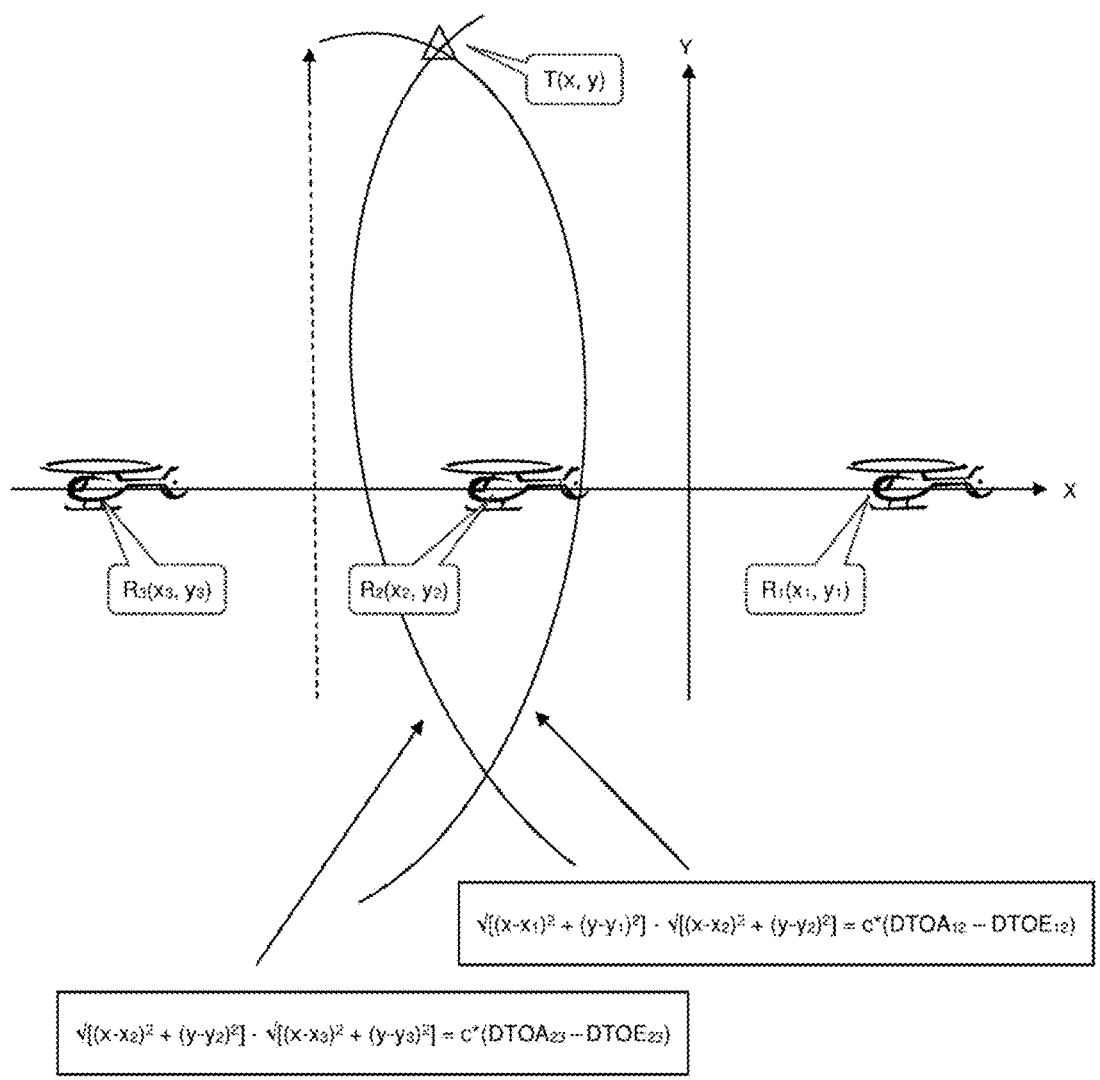
FIG. 1 – Tracking a radio beacon outdoor using DTOA
According to US patent 9709656 - Prior Art

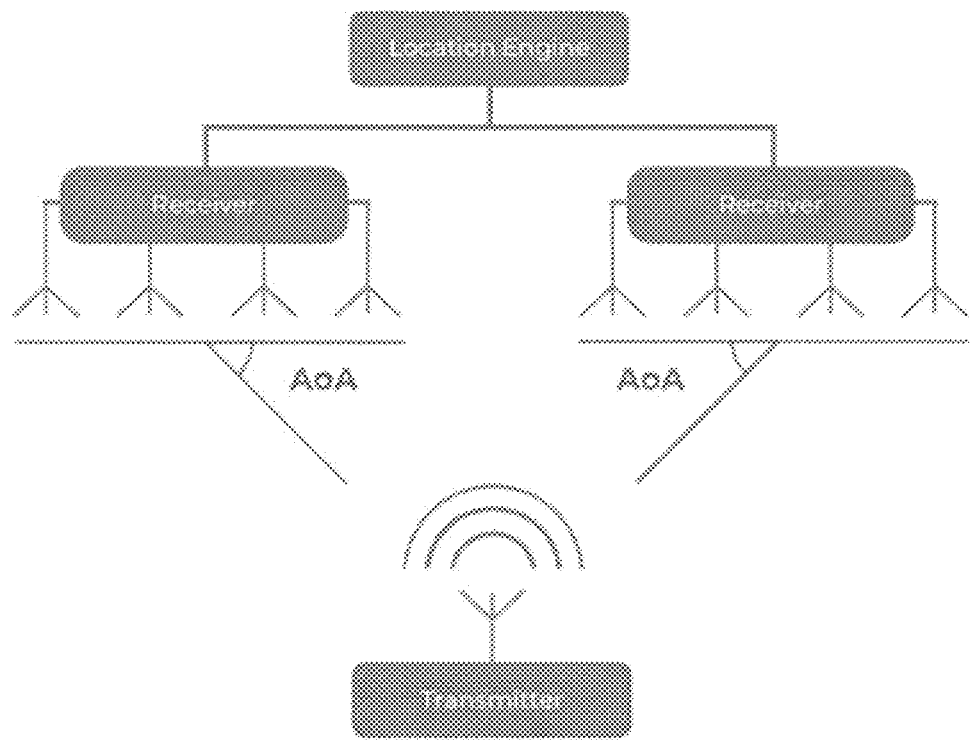
FIG. 2 - Angle of Arrival (AoA) Method - Prior Art

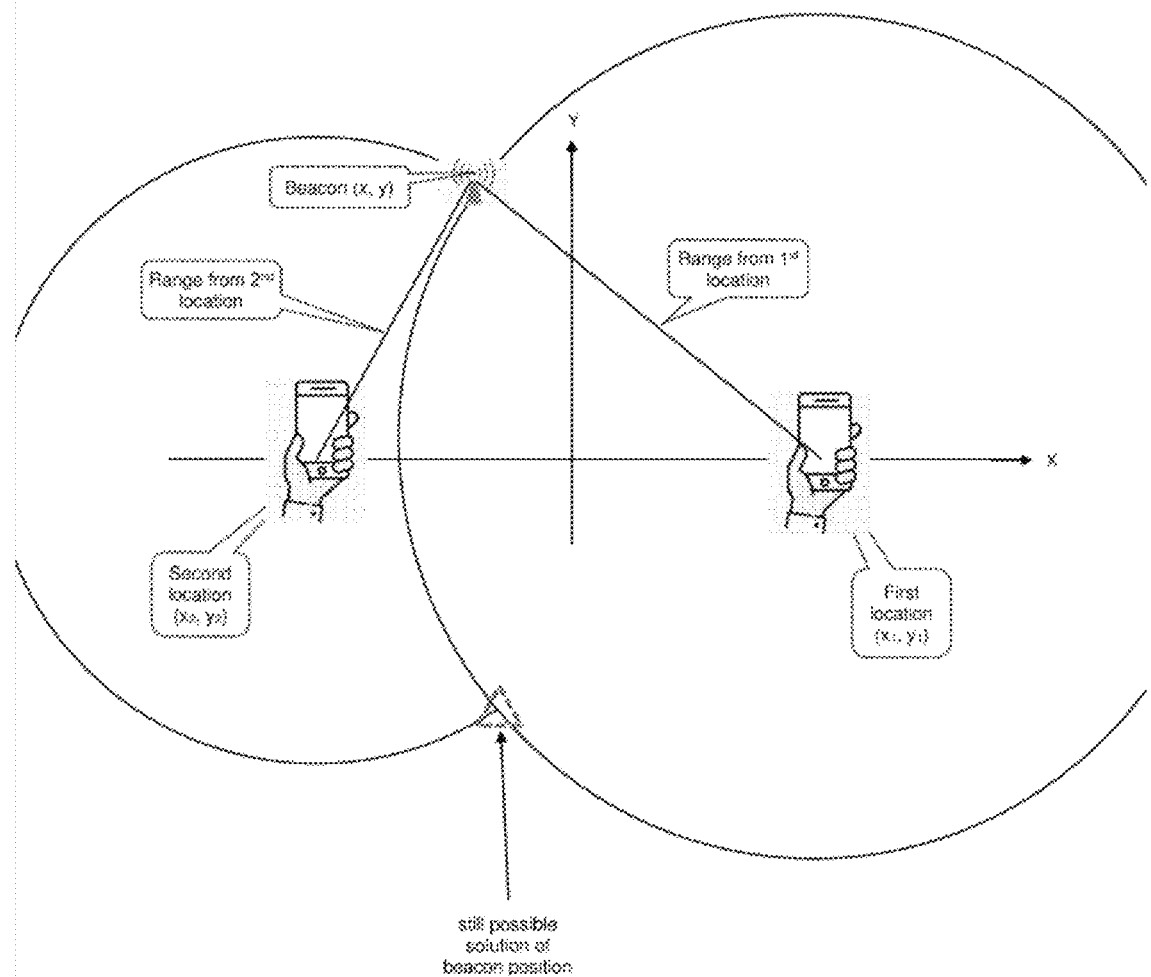
FIG. 3 – Tracking a radio beacon from a mobile device based on RSSI - Prior Art

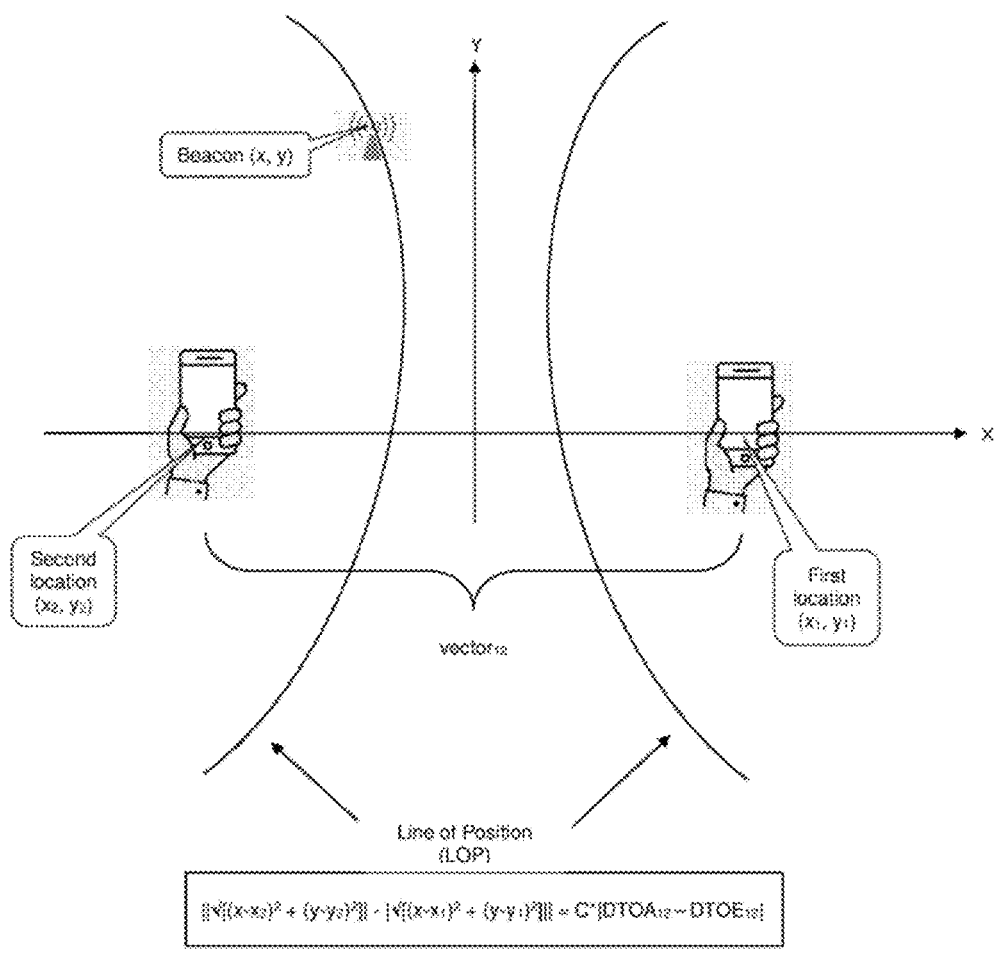
FIG. 4 – LOP on which a beacon is placed drafted indoor based on DTOA

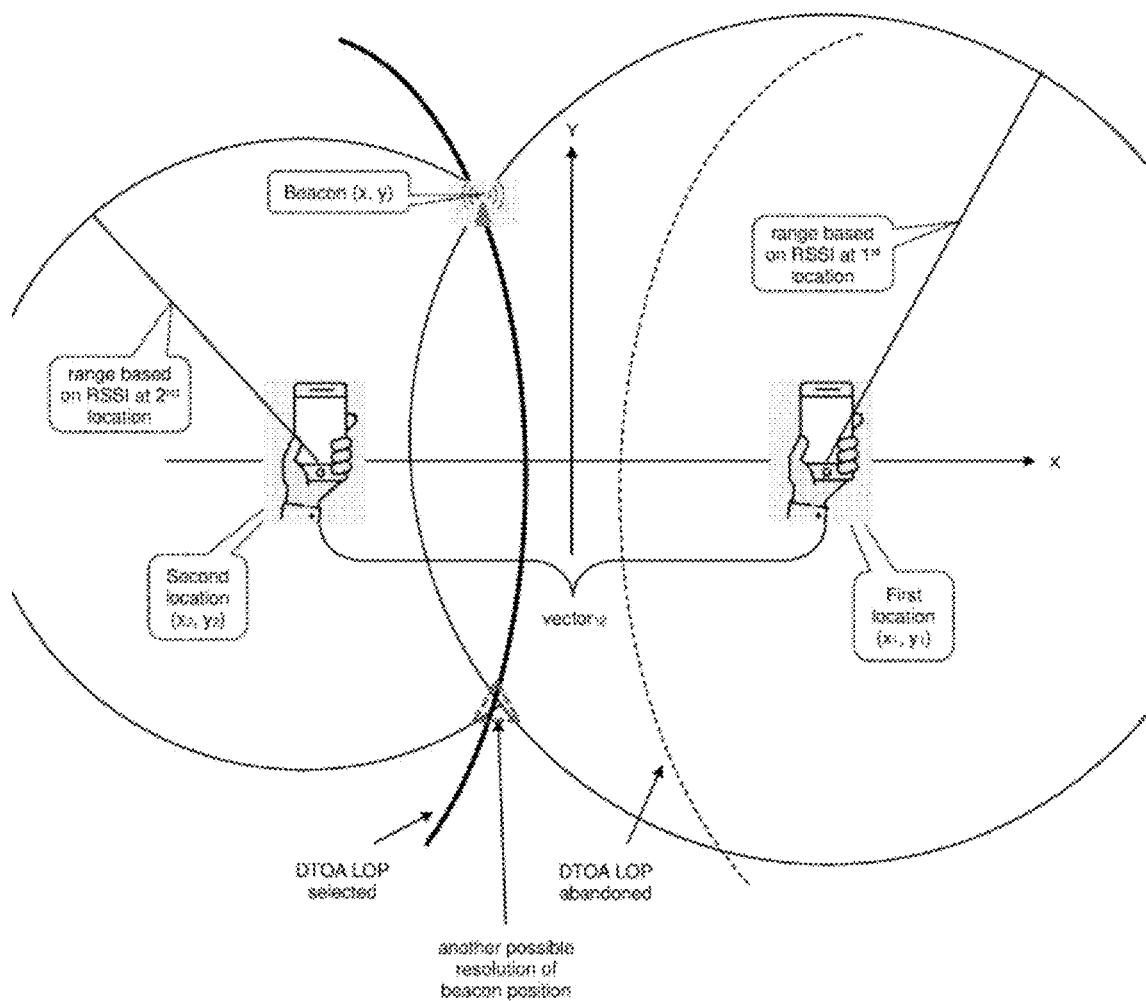

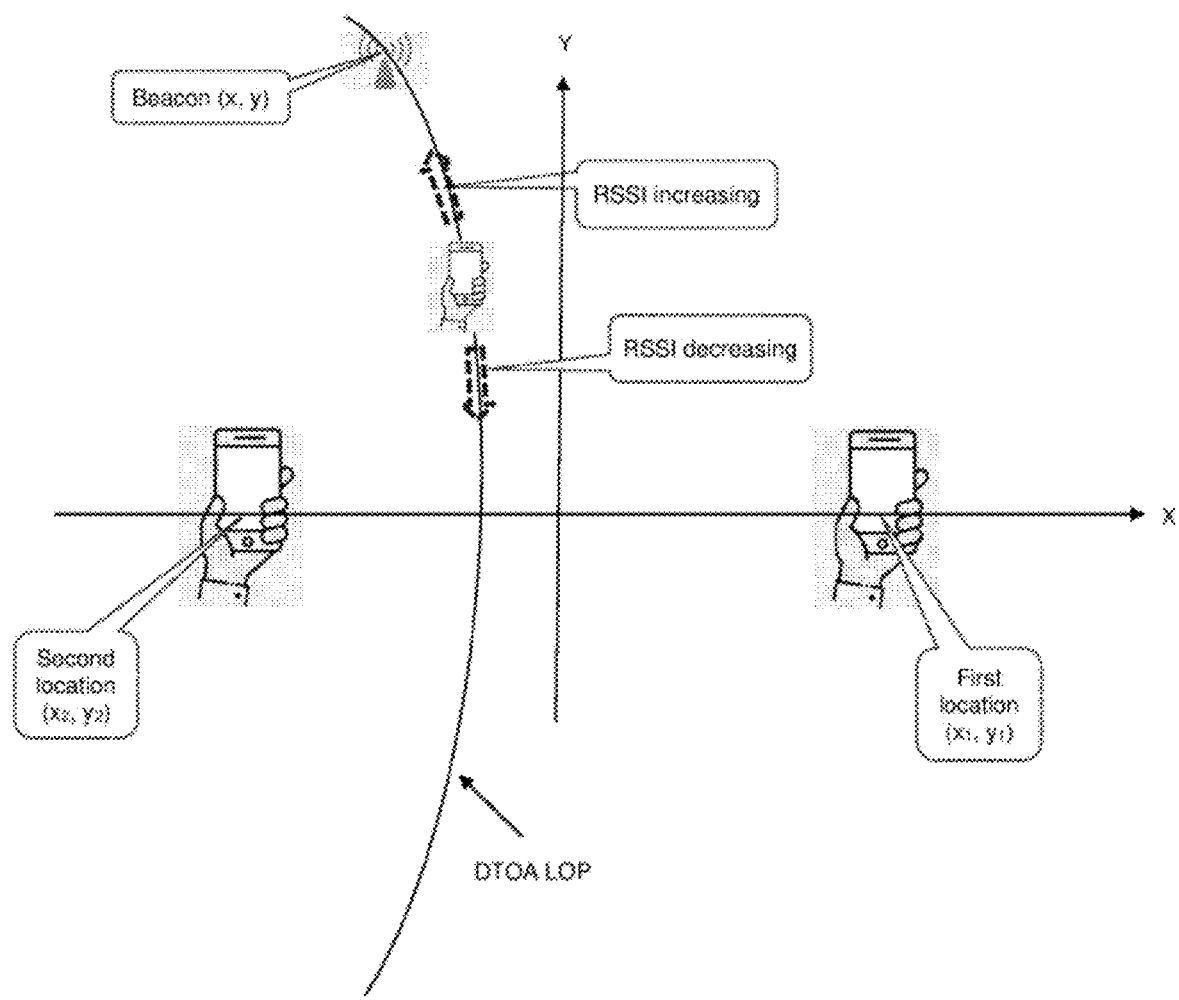
FIG. 6 – selecting moving direction on LOP based on RSSI

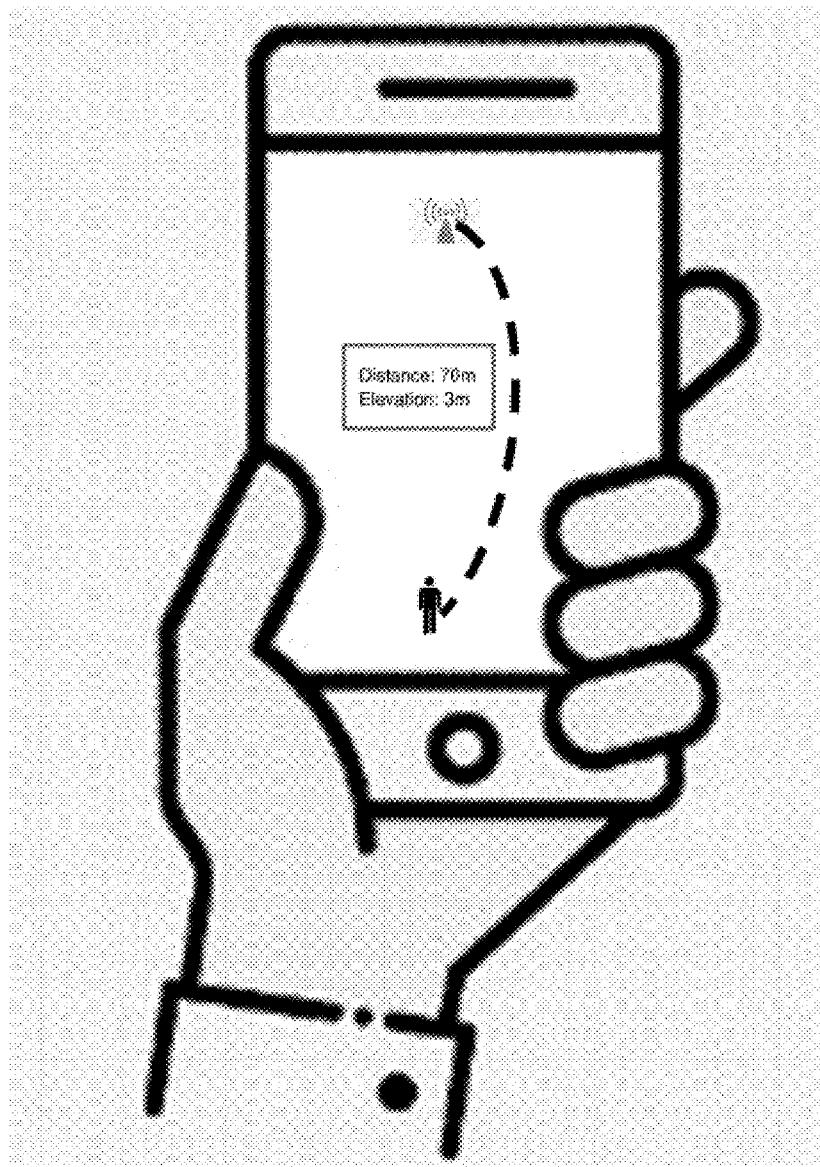
FIG. 7 – Display at mobile device tracking a beacon according to 1st embodiment FIG. 8 – Block Diagram of beacon
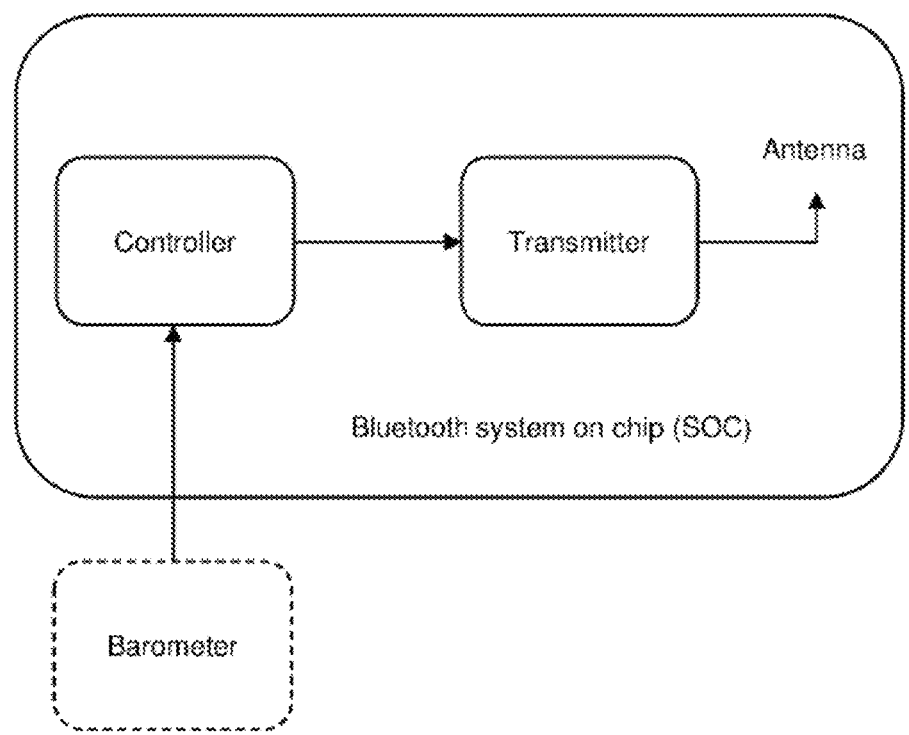

FIG. 9 – Block Diagram of tracking device
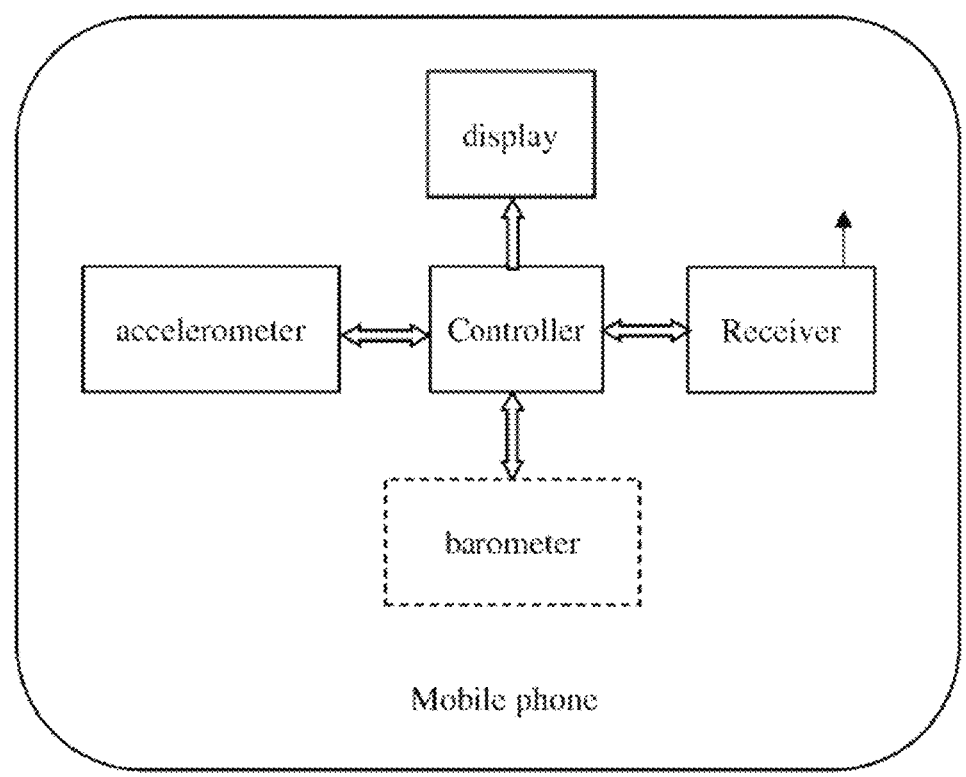

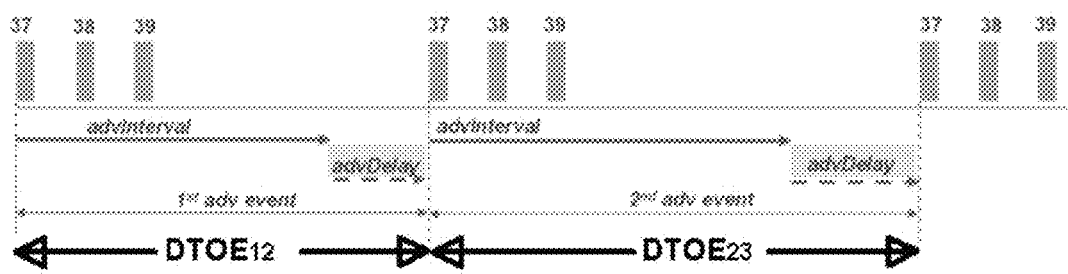
FIG. 10 - beacon signal according to 1st embodiment
- 37, 38, 39 mean Primary Advertising channels which are at 2402, 2426, 2480Mhz.
- advInterval shall be an integer multiple of 0.625 ms in the range of 20 ms to 10,485.759375s
- The advDelay is a pseudo-random value with a range of 0 ms to 10 ms generated by the Link Layer for each advertising event.

TRACKING A RADIO BEACON INDOOR

BACKGROUND OF THE INVENTION

The present invention relates to the general art of wireless communications and particularly radio navigation and radio direction finding, and more specifically: tracking or finding radio beacons indoor.

A radio beacon is a device deploys at a certain location allowing direction-finding equipment to find relative bearing. Radio beacons transmit electromagnetic radiation in the radio wave band. They are used outdoor, at large areas, to geolocate ships, aircraft, vehicles and individuals, sometimes assisted by satellites, and also at small areas, typically indoor, for example to find a lost key holder to which a beacon is attached.

Radio beacons typically transmit continuous or periodic radio signals with limited information, (for example, its identification or location) on a specified radio frequency.

Radio beacons have many applications, including air and sea navigation, propagation research, robotic mapping, radio-frequency identification (RFID), near-field communication (NFC) and indoor navigation, real-time locating systems (RTLS) and mapping.

Radio beacons could also be associated with the Internet of things (IoT), referring to physical objects (or groups of such objects) with sensors, processing ability, software, and other technologies that connect and exchange data with other devices and systems over the Internet or other communications networks. Actually, such IoT devices do not need to be connected to the public internet, they only need to be connected to a network and be individually addressable.

Distress radio beacons, also collectively known as distress beacons, emergency beacons, or simply beacons, are those tracking transmitters that operate as part of the international Cospas-Sarsat Search and Rescue satellite system. When activated, these beacons transmit a 406 MHz signal that when detected by satellites, can be located by triangulation, or by a GPS position encoded into the signal. For the last mile homing, distress beacons emit low power signals at 121.5 MHz, unfortunately encoding no specific ID or position information, due to legacy interoperability restrictions, thus, the homing, i.e. tracking of this signal is usually done with directional antennas.

Wi-Fi (wireless local area networks using the IEEE 802.11b and 802.11g specification) beacons are wireless access points (AP) with specific data transmission capabilities, which do not contain the link layer address of another Wi-Fi device, therefore can be received by any LAN client.

Bluetooth is a short-range wireless technology standard used for exchanging data between fixed and mobile devices over short distances. It employs UHF radio waves in the ISM bands, from 2.402 GHz to 2.48 GHz. Bluetooth is managed by the Bluetooth Special Interest Group (SIG), which oversees development of the specification, manages the qualification program, and protects the trademarks. A network of patents apply to the technology, which are licensed to individual qualifying devices. In 2021, shipments of Bluetooth devices reached 4.7 billion units, with 9% growth forecast.

Bluetooth Low Energy (Bluetooth LE, colloquially BLE, formerly marketed as Bluetooth Smart) is a wireless personal area network technology designed and marketed by the Bluetooth SIG aimed at novel applications in the healthcare, fitness, beacons, security, and home entertainment industries. It is independent of classic Bluetooth and has no compatibility, but Bluetooth Basic Rate/Enhanced Data Rate (BR/EDR) and LE can coexist. Originally named Wibree, it was integrated into Bluetooth 4.0 in December 2009 as Bluetooth Low Energy.

Compared to Classic Bluetooth, Bluetooth Low Energy is intended to provide considerably reduced power consumption and cost while maintaining a similar communication range. Mobile operating systems including iOS, Android, Windows Phone and BlackBerry, as well as macOS, Linux, Windows 8, Windows 10 and Windows 11, natively support Bluetooth Low Energy.

Bluetooth advertising is a method of mobile marketing that utilizes Bluetooth technology to deliver content such as message, information or advertisement to mobile devices such as cellular phones or tablet computer. Bluetooth advertising can also be received via laptop or PDA. Bluetooth advertising generally is a broadcast function. As with all wireless transmission, the range and accessibility to most Bluetooth advertising depends on the transmitter power class and the individual portage of the receiver equipment. However, with advances in mobile devices technology, this distance for proper receiving is increasing to reach 250 meters or more in nowadays smart phones, tablet computers and other mobile devices.

In Bluetooth, and particularly Bluetooth advertising, there are two types of possible communications: Broadcasting or Connection. Broadcasting doesn't need pairing (connection). Broadcaster will send data along with its ID and any receiver can receive it by recognizing that ID.

Bluetooth beacons are hardware transmitters—a class of Bluetooth Low Energy (LE) devices that broadcast their identifier to nearby portable electronic devices. The technology enables smartphones, tablets and other devices to perform actions when in close proximity to a beacon.

One application of Bluetooth beacons is an indoor positioning system, which helps smartphones determine their approximate location or context. With the help of a Bluetooth beacon, a smartphone's software can approximately find its relative location to a nearby Bluetooth beacon. Retail stores use the beacons for mobile commerce, offering customers special deals through mobile marketing, and can enable mobile payments through point-of-sale systems.

Bluetooth beacons differ from some other location-based technologies as the broadcasting device (beacon) is only a 1-way transmitter to the receiving smartphone or receiving device, and necessitates a specific app installed on the device to interact with the beacons. Thus, only the installed app, and not the Bluetooth beacon transmitter, can track users.

Bluetooth beacon transmitters come in a variety of form factors, including small coin cell devices and USB sticks.

AirTag is a specific type of Bluetooth beacon for tracking device, and iBeacon is a protocol associated with the Airtag, both beacon and protocol developed by Apple. AirTag is designed to act as a key finder, which helps people find personal objects (e.g. keys, bags, apparel, small electronic devices, vehicles). In addition to the 2.4 GHz Bluetooth, Airtag obtains two other communication capabilities: UWB (ultra-wideband) at 6.5-8 GHz and NFC (near field communication) at 13.56 MHz. Due to transmission power and frequency, the tracking range of the AirTag UWB is about 5 meters, and the NFC range is typically less than 5 cm. the Bluetooth communication range is much higher, typically about 100 m (at transmission power of 5-10 dBm) or even more, however presently at this range there is no accurate location determination, just an indication that the AirTag is in range of the tracking device, usually a Bluetooth enabled iPhone or iPad.

It is therefore an object of the present invention to enable accurate tracking of a Bluetooth beacon, including BLE, and particularly AirTag and similar tags, through its entire communication range.

Geolocation of radio beacons, if necessary, can be done in various ways. For outdoor applications, embedding a GNSS (Global Navigation Satellite System, such as: GPS, Galileo, Glonass, Beidou, etc.) receiver in a radio beacon and reporting the acquired GNSS position via RF channels is quite popular, since state of the art GNSS receivers are typically small, low power consuming and low cost. For example, GNSS receivers are popular in distress beacons.

Another geolocation method, particularly popular indoor, is based on the measurement of the angle of arrival (AOA) or angle of departure (AOD) of the beacon signals, using directional antennas or antenna arrays, as illustrated in FIG. 2. In the Angle of Arrival method, a transmitting device, such as a small asset tag, uses a single antenna to transmit a special signal. The receiving device, such as a fixed locator installed in a warehouse, has multiple antennas arranged in an array. As the transmitted signal crosses the array, the receiving device collects data enabling it to calculate signal direction. Combing measurements of two such antenna arrays provide the transmitter's location, in 2D (two dimensions or two dimensional).

However, the AOA and AOD methods require a relatively complex array of antennas, which is not practical in personal mobile devices typically used for tracking a beacon.

Therefore, it is another object of the present invention to enable accurate geolocation of a beacon by a single tracking device, using omnidirectional antennas.

In principle, geolocation based on radio signals emitted and detected even using omnidirectional antennas is quite simple, by estimation of the transmission power of the beacon signal, and measuring the received power of this signal at the tracking device, then calculating the path loss, or path attenuation, and deriving from this path loss the distance or range between beacon and tracking device, as following:

(received EIRP−transmitted EIRP)=Path loss [dB]

=20 log(4$\pi d/\lambda$);

wherein d is the distance between transmitter and receiver, $\lambda$ is the wavelength of the RF signal, and wherein EIRP (Effective Isotropic Radiated Power) is practically the transmitted (or received) RF power plus (or minus, in dB) the antenna gain. This method is illustrated in FIG. 3, in a 2D representation.

However, though ranging based on RF power measurement is relatively easy, it is usually inaccurate, since the RF signal propagation is attenuated not only due to range but also due to obstacles and multipath, present at the tracking site. For example, in Bluetooth frequency of 2.4 GHz, a path loss of 80 dB could indicate 100 m range, or 50 m range+ concrete wall between beacon and tracking device.

It is therefore another object of the present invention to enable accurate positioning of a beacon at a tracking device, insensitive to obstacles in the tracking site.

U.S. Pat. No. 9,709,656 by Katz, for Tracking A Radio Beacon From A Moving Device, discloses a method and devices for tracking a radio beacon from a moving device, based on difference in time of arrival (DTOA) measured at the tracking device, of periodic signals emitted by the beacon at a known difference in time of emission (DTOE). This method is effective outdoor, however since it involves GNSS positioning at the tracking device, it is not practical indoor, as illustrated in FIG. 1.

It is therefore also an object of the present invention to enable accurate positioning of a beacon at a tracking device, indoor, independent of GNSS.

Another shortcoming of U.S. Pat. No. 9,709,656 is that DTOE is estimated at the tracking device based on a predefined timing, which the beacon obeys, but does not address the possibility that the beacon will change this timing on the fly. Such timing alteration could well be present in Bluetooth beacons, wherein the time interval between advertising events, which could be effectively used to signal the DTOE, is required to be pseudo-random, by the Bluetooth standard.

Therefore, it is a further object of the present invention to enable communicating the DTOE selected at the beacon, implicitly or explicitly, in real time, to the tracking device.

Still referring to U.S. Pat. No. 9,709,656, which discloses a tracking method based on DTOA, that patent fails to teach how can the geometrical ambiguity associated with the hyperbola defined by C*|DTOA−DTOE| be removed using just two signals. This ambiguity, of two possible branches of a hyperbola as a valid LOP, derives from the hyperbola definition such that for any point P on a plane, the absolute difference of the distances between P to two fixed points (the foci) is constant, and since this difference of distances can be either positive or negative, then the hyperbola is comprised of two branches, mirrored over the Y-axis. In the outdoor tracking context of U.S. Pat. No. 9,709,656, where the beacon is detected by satellites or helicopters, that ambiguity could be practically removed, as the hyperbola branches are typically far away from each other, due to measurements made at fast moving spacecraft and aircraft, thus, one of these hyperbola branches is usually found to be unlikely, for example drafted deep in the continent while tracking a ship. However, the present invention discloses an indoor tracking method, where the beacon transmission period is relatively short, and the tracking device moves slowly, typically been carried by hand, so the two branches of the hyperbola resolving C*|DTOA−DTOE| are likely to be close enough to be both considered as valid solutions.

Thus, it is another object of the present invention to remove any ambiguity associated with the geometrical solution of the beacon position.

U.S. Pat. No. 7,711,375 by Liu discloses a Method and system for determining a location of a wireless transmitting device and guiding the search for the same. Liu discloses determining the location of a wireless transmitting device using a movable detection station . . . measurements at a plurality of positions of said movable detection station . . . determining at least one of the location and orientation of said movable detection station at each of said positions . . . performing estimation of the location of said wireless transmitting device. Liu discloses measurement of delay of the signal propagation, from said wireless transmitting device to said movable detection station . . . measurement of difference of the signal propagation delays, from said wireless transmitting device to said movable detection station . . . wherein the difference of delays is between pairs of said positions of said movable detection station . . . .

U.S. Pat. Nos. 7,616,155 and 7,804,448 by Bull disclose Portable iterative geolocation of RF emitters. Bull discloses a method for locating an emitter of interest (EOI) using at least one portable geolocation sensor . . . receive, time stamp and store EOI transmissions during a first period of time; moving the first portable geolocation sensor to a second location; at the second location, using the first portable geolocation sensor to receive, time stamp and store EOI transmissions during a second period of time; and computing the location of the EOI using data representative of the EOI transmissions stored during said first and second periods of time . . . .

Yet Liu and Bull focus on outdoor location, and fail to disclose transmission of periodic signals. Liu and Bull also fail to disclose communication of the time difference between transmissions (DTOE) to the tracking device, which is instrumental in combination with the time difference of arrival (DTOA). Liu and Bull also fail to disclose calculation and display of the direction to the beacon.

Therefore, it is another object of the present invention to display direction instructions at the tracking device, enabling the user to promptly and accurately approach the beacon.

Other objects and advantages of the invention will become apparent as the description proceeds.

SUMMARY OF THE INVENTION

The present invention discloses a method for determining a line of position (LOP) on which a radio beacon is placed, at a mobile device, comprising the steps of:
  a. at the radio beacon transmitting periodic signals, comprising at least a first signal and a second signal, configuring the difference in time of emission of said signals as: $DTOE_{12}=n*\Delta t$, wherein n is an integer number and $\Delta t$ is a fixed time duration;
  b. communicating to said device, at least one of: $DTOE_{12}$ or $\Delta t$;
  c. at the device, at a first location, recording a time of arrival of said first signal ($TOA_1$);
  d. moving said device from said first location to a second location, measuring direction and distance from said first location to said second location ($vector_{12}$);
  e. at the device, at said second location, recording a time of arrival of said second signal ($TOA_2$), and determining the difference in time of arrival of first and second signals: $DTOA_{12}=TOA_2-TOA_1$;
  f. at the device, determining a line of position ($LOP_{12}$) on which said radio beacon is placed, based on: $DTOA_{12}$, $vector_{12}$ and $DTOE_{12}$; wherein said LOP is a hyperbola, defined in a local coordinate system by two foci at both ends of said $vector_{12}$, and $C*|DTOA_{12}-DTOE_{12}|$ been the difference in distances between the beacon and each of said foci, and C is the speed of light.

Preferably, $\Delta t$ is a quantum time period used to discretize DTOE, such that no other than $n*\Delta t$ values of DTOE are permitted, for integer n's, allowing communicating DTOE or $\Delta t$ at low resolution, i.e., small number of bits, still at high accuracy. In addition, this approach enables the tracking device to determine DTOE even if the integer number n is not explicitly communicated (assuming that $\Delta t$ is large enough), a method which was successfully introduced in the GPS navigation message broadcast.

According to a preferred embodiment of the present invention, the beacon, also known as tag or transmitter, or IoT device, is a small battery powered device attached to an object which geographical position is desired to be determined remotely, such as: person (e.g. dementia/ill/injured person been taken care of; soldier or policeman on duty; visitor or employee at a highly secured or dangerous site; athlete participating in sport competition), animal (wild or domestic), vehicle (e.g. bicycle parking by train station, car in large parking lot), suitcase or briefcase, personal objects (e.g. keys, bags, apparel, small electronic devices), goods, mailed/delivered item, weapon or ammunition, to name a few. The mobile device tracking this beacon is preferably a personal mobile device, such as mobile phone, smartphone (iphone or Android), tablet (such as iPad), laptop, etc.

Though the disclosed method could be used also outdoor, it is particularly effective indoor, since it does not depend on any GNSS service, actually does not depend on any other communication infrastructure, neither terrestrial (such as cellular networks), nor spaceborne.

According to a first embodiment of the present invention, the beacon is Bluetooth compatible, and the tracking device is Bluetooth enabled, such that Bluetooth signals are used to track the beacon. Furthermore, the preferred implemented Bluetooth protocol is Bluetooth advertising, configured in broadcast mode, such that the packages been sent indicate that no Bluetooth connection is required, enabling a one-way communication between beacon and tracking device.

Then, the beacon signals are preferably part of a Bluetooth advertising event, and the tracking device is configured to detect Bluetooth advertising event signals, avoiding the need of pairing and connection according to Bluetooth.

Further according to a first embodiment of the present invention, at the tracking device, $vector_{12}$ is determined by an accelerometer measuring the direction and magnitude of the movement between different locations. Luckily, present (year 2022) smartphones typically contain quite accurate accelerometers, enabling such measurement in three axes.

Preferably, the disclosed method further comprising the steps of:
  a. at the beacon, encoding in each of said signals the transmission power level thereof;
  b. at the device, decoding said encoded transmission power level;
  c. at the device, measuring the receiving signal strength indication (RSSI) of said signals;
  d. at the device, estimating the range between beacon and device, based on said decoded transmission power level and said measured RSSI, and determining a LOP based on RSSI associated with the first signal ($LOP\text{-}RSSI_1$), and a LOP based on RSSI associated with the second signal ($LOP\text{-}RSSI_2$);
  e. at the device, determining the beacon position, in said local coordinate system, at a crossing point of: $LOP_{12}$, $LOP\text{-}RSSI_1$, and $LOP\text{-}RSSI_2$, accounting for measurement inaccuracy.

In a first embodiment of the invention, the transmission power level is encoded in dBm, allocating a single byte in the advertising packet, covering a range between −128 dBm to 127 dBm.

At the tracking unit, upon RSSI measurement, the distance between beacon and device is estimated as d, according to the path attenuation formula: (received EIRP−transmitted EIRP) $[dB]=20\ \log(4\pi d/\lambda)$, and when using Bluetooth, $\lambda \approx 12$ cm.

It should be noted that determining the distance, indoor, between beacon and tracking device, based on RSSI, is usually limited in accuracy. For example, a path loss of 80 dB could be interpreted as 100 m range, or 50 m range+concrete wall between beacon and tracking device. However, determining the LOP based on known DTOE (or $\Delta t$) and measured DTOA, is much more accurate. Still, RSSI measurements could contribute to geolocation, enabling removal of the geometrical ambiguity built in the DTOA positioning. In the simpler case where the tracking site is substantially planar, with beacon and tracking device more or less at same level above the ground, the tracking geometry is 2D, i.e., resolved in a X-Y coordinate system. Then, as shown in FIG. 5, the DTOA based LOP is a hyperbola with two branches, and the RSSI LOP is a circle, and only one of the hyperbola branches has common points with both two circles. This will be further explained in the detailed description of the present invention. When the beacon and tracking device are not on a same level, such as when searching for a beacon attached to a key holder lost somewhere in a three-floor house, or looking for a child's kite collided into a tree, the tracking geometry is 3D, i.e., X-Y-Z coordinate system, so a C*|DTOA−DTOE| provides a hyperboloid, and (RSSI−tx power level) provides a sphere, and still only one of the hyperboloid branches has common points with both two spheres. So, monitoring two signals at the tracking device enables determining a single unambiguous LOP on which the beacon is placed.

Then, in a preferred embodiment of the present invention, an additional third signal is emitted by the beacon, detected by the tracking device at a third location, enabling the device determining another LOP, and estimating the position of the beacon.

Further, according to a first embodiment of the present invention, at the device, a LOP is displayed along with the device self-position, and an estimated direction and distance to the beacon. In this context, positions and directions are not necessarily defined in a global coordinate system such as WGS-84 used by the GPS, and not necessarily referring to the geographical or magnetic North, but rather relatively to the tracking device, i.e., range and direction (e.g., relatively to the device screen frame) of the beacon from the tracking device. In this local coordinate system defined at the tracking device, self-position is associated with the first location while visiting there, and associated with the second location while visiting there, and so on. Furthermore, this local coordinate system is defined by $vector_{12}$, such that the center of $vector_{12}$ is the origin of this Cartesian local coordinate system, and the orientation of $vector_{12}$ defines the orientation of the X-axis.

According to a second embodiment of the present invention, the tracking device comprises also a barometric sensor, and configured to measure the ambient barometric pressure, from time to time. Further, the beacon also comprises a barometric sensor, and is configured to measure the ambient barometric pressure, from time to time, and encode said pressure measurement in the transmitted signal. As persons skilled in the art appreciate, the barometric pressure might change not only due to elevation above mean seal level (MSL), but also due to weather conditions, however, for two barometric readings made more or less at same time and temperature and area, the difference in ambient pressure reading could well indicate a difference in height above MSL, thus, contribute to the resolution of the beacon location. Also, reading the barometric pressure at the tracking device, on the move, could enhance the accuracy of self-position determination, therefore enhance the accuracy of relative range and direction to the beacon, better guiding the user to find the beacon.

Therefore, according to a second embodiment of the present invention, the disclosed tracking method further comprises, at the tracking device, measuring an ambient barometric pressure, and comparing said pressure measurement with at least one of: another pressure measurement made at the device, or a pressure measurement decoded from the beacon signal; and using said pressure comparison to improve the accuracy in determining LOP, self-position and beacon position, in a local coordinate system.

The present invention also discloses a mobile device for tracking a radio beacon, said device comprising: a receiver, an accelerometer (also known as IMU—Inertial Measurement Unit), a controller and a display; said device configured to determine the difference in time of emission ($DTOE_{12}$) between a first signal and a second signal emitted by the beacon, and measure the difference in time of arrival ($DTOA_{12}$) thereof, said first signal arriving while the device is at a first location, and said second signal arriving while the device is at a second location; and measure the distance and direction between said two locations ($vector_{12}$), and determine a line of position ($LOP_{12}$) on which the beacon is placed, based on $DTOA_{12}$, $vector_{12}$ and $DTOE_{12}$; wherein said LOP is a hyperbola, defined in a local coordinate system by two foci at both ends of said $vector_{12}$, and $C*|DTOA_{12}−DTOE_{12}|$ been the difference in distances between the beacon and each of said foci, and wherein C is the speed of light.

According to a first embodiment of the present invention, the tracking device is a personal mobile phone or tablet, configured to determine $vector_{12}$ using the built in accelerometer to measure the direction and magnitude of the movement between said first and second locations. Further, a local coordinate system is determined at the tracking device, wherein the center of $vector_{12}$ is the origin, and the X-axis is directionally aligned with $vector_{12}$.

Further according to a first embodiment of the present invention, the device is configured to decode the transmission power level encoded in the signal, and measure the receiving signal strength indication (RSSI) thereof, and estimate the range between beacon and device, based on said decoded transmission power level and said measured RSSI; and determine a LOP based on RSSI associated with the first signal ($LOP\text{-}RSSI_1$), and a LOP based on RSSI associated with the second signal ($LOP\text{-}RSSI_2$), and determine the beacon position, in said local coordinate system, at a crossing point of: $LOP_{12}$, $LOP\text{-}RSSI_1$, and $LOP\text{-}RSSI_2$, accounting for measurement inaccuracy.

As discussed elsewhere in this document, the term LOP (line of position) may have a slightly different interpretation regarding 2D or 3D geometry, but in the context of the present invention LOP represents a line or surface which is the locus of points obeying a certain mathematical relationship. So, if the beacon and tracking device happen to be on same level, then LOP 12 is a hyperbola, while $LOP\text{-}RSSI_1$, and $LOP\text{-}RSSI_2$ are circles. However, if the tracking device also changes its elevation above ground level while moving, or the beacon happens to be elevated from the tracking device (still looking for the kite stuck on a tree . . . ), then the context is a 3D geometry, wherein LOP 12 is a hyperboloid, and $LOP\text{-}RSSI_1$, and $LOP\text{-}RSSI_2$ are spheres. Obviously, 3D computing is more complex than 2D, and it might be more convenient, even when the beacon is elevated from the tracking device, to draft and resolve 2D LOP, even in different planes, each including the last locations visited by the tracking device, and the beacon estimated position.

Yet, either applying 2D or 3D geometry, the distance between beacon and device is estimated according to the basic path attenuation formula: (received EIRP−transmitted EIRP) [dB]=20 log(4Πd/λ), though might be subject to some alterations according to the tracking site environment, particularly considering indoor vs. outdoor. These alterations are out of the scope of the present invention.

In a preferred embodiment of the present invention, the tracking device is further configured to detect an additional third signal emitted by the beacon, and determine another LOP, and update the estimated position of the beacon.

Further, according to a first embodiment of the present invention, the tracking device is configured to display the LOP along with the device self-position, and an estimated direction and distance to the beacon, as illustrated in FIG. 7.

Further, according to a first embodiment of the present invention, the tracking device comprises a barometric pressure sensor (also known as altimeter), and configured to measure an ambient barometric pressure, and compare said pressure measurement with at least one of: another pressure measurement made at the device, or a pressure measurement communicated in the beacon signal; and use said pressure comparison to improve the accuracy of determined LOP, self-position and beacon position, in said local coordinate system. Practically, the barometric reading difference between beacon and tracking device could be used at the tracking device to move from 3D to 2D equations, even if the beacon is elevated from tracking device.

The present invention further discloses a radio beacon trackable by a mobile device, said beacon comprising: a transmitter and a controller; said beacon configured to transmit periodic signals, comprising at least a first signal and a second signal, separated in time of emission by $DTOE_{12}$, wherein $DTOE_{12}=n*\Delta t$, n been an integer number and $\Delta t$ a fixed time duration, and encode in the signal its transmission power level, and at least one of: $DTOE_{12}$ or $\Delta t$; enabling at a distanced mobile device decoding said transmission power level, and at least one of: $DTOE_{12}$ or $\Delta t$, and measuring the difference in time of arrival of said signals ($DTOA_{12}$) while the device is placed in two different locations, correspondingly, and further enabling the device measuring the distance and direction between said two different locations ($vector_{12}$); then enabling the device determining and displaying a line of position ($LOP_{12}$) on which the beacon is placed, in a local coordinate system, based on said $DTOA_{12}$, $vector_{12}$, $DTOE_{12}$, and the received signal strength (RSSI) associated with said signal, wherein said LOP is a hyperbola, defined by two foci at both ends of said $vector_{12}$, and $C*|DTOA_{12}-DTOE_{12}|$ been the difference in distances between the beacon and each of said foci, and C been the speed of light.

According to a first embodiment of the present invention, the beacon is a Bluetooth Low Energy device, emitting signals that are part of a Bluetooth advertising event.

Further according to a first embodiment of the present invention, the beacon is configured to set the time between consecutive advertising events to a sum of a constant time interval (advinterval) and a pseudo-random time interval (advdelay), wherein advdelay=$m*\Delta t$, m been an integer number with pseudo-random distribution and $\Delta t$ a fixed time duration.

Then, in a preferred embodiment of the present invention, the beacon is further configured to transmit another third signal, encoded with its transmission power level, and at least one of: DTOE or $\Delta t$, wherein DTOE is associated with the third signal and a previously transmitted signal, enabling the device determining at least another LOP, and estimating the position of the beacon.

According to a second embodiment of the present invention, the beacon further comprises a barometric pressure sensor (also known as altimeter), and configured to measure an ambient barometric pressure, and encode said pressure measurement in the signal.

Other objects and advantages of the invention will become apparent as the description proceeds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 1 illustrates a prior art method for Tracking a radio beacon outdoor using DTOA according to U.S. Pat. No. 9,709,656. A helicopter is shown, flying from right to left along the X-axis of a 2D Cartesian coordinate system, visiting three points: $R_1(x_1, y_1)$, $R_2(x_2, y_2)$, $R_3(x_3, y_3)$, searching for a beacon marked by a small triangle at point T(x, y). The beacon is shown to be placed on a crossing point of two hyperbolas, whose formulas are written, inside rectangular frames, further below, based on the difference in time of emission (DTOE) of the signals transmitted by the beacon, and the difference in time of arrival (DTOA) of said signals, as measured at the tracking device assumed to be installed onboard the helicopter. According to U.S. Pat. No. 9,709,656, the position at $R_1$, $R_2$ and $R_3$ is acquired by GNSS, so also the beacon coordinates (x, y) are defined in a global coordinate system, typically WGS-84.

FIG. 2 illustrates a prior art Angle of Arrival (AoA) Method to geolocate a radio beacon. The beacon (Transmitter) is shown at the bottom of the figure, coupled to an assumedly omnidirectional antenna. Above the transmitter, two receivers are shown, side by side, each coupled to an array of four antennas, enabling determining the angle of arrival of the signal arrived from the beacon, even if radiated omnidirectionally. The receivers are coupled to one location engine, enabling determining the beacon position, in 2D, based on the two measured AOAs, and knowing the location of the two receivers.

FIG. 3 illustrates a prior art method for Tracking a radio beacon from a mobile device based on RSSI. On the X-axis of a 2D Cartesian coordinate system, a mobile device is depicted at two different locations: a first location $(x_1, y_1)$ and second location $(x_2, y_2)$. Somewhere above the X-axis, a beacon is depicted at a location with coordinates (x, y), where two circles cross each other: a first circle centered at $(x_1, y_1)$ and second circle centered at $(x_2, y_2)$. The range from the beacon to each of said device locations, is marked, obviously as the radius of said each circle. The figure shows that the two circles have two common points: one is the true position of the beacon, at (x, y), and the other is mirrored over the X-axis, at (x, −y) and marked "still possible solution of beacon position".

FIG. 4 depicts LOP on which a beacon is placed drafted indoor based on DTOA. On the X-axis of a 2D Cartesian coordinate system, a mobile device is depicted at two different locations: a first location $(x_1, y_1)$ and a second location $(x_2, y_2)$. Somewhere above the X-axis, a beacon is depicted at a location with coordinates (x, y), on the left hyperbola branch, which formula is indicated below, in a rectangular frame, noting that also the right branch of the hyperbola is a valid geometrical representation of this formula. In this formula, actually an equation, $DTOA_{12}$ is the difference in time of arrival of two signals transmitted by the beacon, at a difference in time of emission of $DTOE_{12}$, assuming that a first of these signals arrives at the mobile device while visiting the first location, and a second of these signals arrives at the mobile device while visiting the second location. The distance between said first location and said second location is marked as $vector_{12}$, and it is actually the basis for the local coordinate system X-Y, since the direction of $vector_{12}$ defines the X-axis, and the center of $vector_{12}$ defines the origin (0, 0) of the local coordinate system. Thus, the Y-axis is perpendicular to $vector_{12}$, and the first location and the second location are equally distanced from the Y axis.

FIG. 5 shows a method for determining LOP based on DTOA+LOP based on RSSI. On the X-axis of a 2D Cartesian coordinate system, a mobile device is depicted at two different locations: a first location ($x_1$, $y_1$) and a second location ($x_2$, $y_2$). The distance between said first location and said second location is marked as $vector_{12}$, and it is actually the basis for the local coordinate system X-Y, since its direction defines the X-axis, while the Y-axis is erected perpendicularly to $vector_{12}$, at its center, such that the first location and the second location have the same distance from the Y axis. Somewhere above the X-axis, a beacon is depicted at a location with coordinates (x, y), on a hyperbola branch, drafted in a wide solid line, marked as "DTOA LOP selected". At the right side of the Y-axis, another hyperbola branch is drafted in dashed line and marked as "DTOA LOP abandoned". Further, two circles are depicted, representing LOP based on RSSI, one centered at the first location and another centered at the second location, and the circles radii are accordingly marked "range based on RSSI at $1^{st}$ location" and "range based on RSSI at $2^{nd}$ location". It is shown that the selected DTOA LOP branch and both two circles have two common points: one is the true position of the beacon, at (x, y), and the other is mirrored over the X-axis, at (x, −y) and marked "another possible resolution of beacon position".

FIG. 6 illustrates a method for selecting moving direction on LOP based on RSSI. On the X-axis of a 2D Cartesian coordinate system, a mobile device is depicted at two different locations: a first location ($x_1$, $y_1$) and a second location ($x_2$, $y_2$). Somewhere above the X-axis, a beacon is depicted at a location with coordinates (x, y), on a hyperbola branch at the left side of the Y-axis, marked as "DTOA LOP". A smaller icon depicting same mobile device, is shown on the LOP, above the X-axis, from which two dashed lines are shown, one upward and the other downward the LOP, illustrating two different directions of movement on the LOP. Accordingly, text boxes indicate that the upward movement is associated with increasing RSSI measured at the mobile device (since the distance to the beacon becomes shorter), while the downward movement is associated with decreasing RSSI measured at the mobile device (since the distance to the beacon becomes larger).

FIG. 7 illustrates a Display at mobile device tracking a beacon according to P t embodiment. A hand-held mobile device is illustrated, on which a dotted curved line is displayed; at the bottom side of this line a generic person icon is shown, while a beacon icon is shown at the upper side of the line. Asides the dotted line, appears a text indicating the distance and elevation to the beacon.

FIG. 8 illustrates a Block Diagram of beacon according to the present invention. The main block, indicating inside "Bluetooth system on chip (SOC)", comprises two inner solid-line blocks, one marked "Controller" and the other marked "Transmitter", and one dashed-line block, marked "barometer", which is optional. Further, an antenna is shown coupled to the transmitter. It should be noted that the Bluetooth transmitter is practically a transceiver.

FIG. 9 illustrates a Block Diagram of tracking device according to the present invention. The main block, indicating inside "mobile phone", comprises five inner blocks, from which the center block is marked "Controller", coupled to other four blocks: "Receiver", "display", "accelerometer" and "barometer" (optional, in dashed-line). Further, an antenna is shown coupled to the receiver.

FIG. 10 illustrates the beacon signal according to Pt embodiment. At the upper side of the picture, three groups of three signals each are depicted by vertical rectangles marked by 37, 38, and 39. Each group of three signals defines an advertising event according to the Bluetooth standard, wherein the time difference between two consecutive advertising events is marked as advinterval+advDelay. Further down, the time between the start of first and second events is marked as $DTOE_{12}$, and the time between the start of second and third events is marked as $DTOE_{23}$. At the bottom side of the picture, three bullets specify some aspects of the Bluetooth advertising, including:
- the frequency of transmission associated with each of the channels 37, 38 and 39;
- advinterval timing restrictions;
- advDelay timing restrictions.

DETAILED DESCRIPTION

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The present invention discloses a method for determining a line of position (LOP) on which a radio beacon is placed, at a mobile device, comprising the steps of:
a. at the radio beacon transmitting periodic signals, comprising at least a first signal and a second signal, configuring the difference in time of emission of said signals as: $DTOE_{12}=n*\Delta t$, wherein n is an integer number and $\Delta t$ is a fixed time duration;
b. communicating to said device, at least one of: $DTOE_{12}$ or $\Delta t$;
c. at the device, at a first location, recording a time of arrival of said first signal ($TOA_1$);
d. moving said device from said first location to a second location, measuring direction and distance from said first location to said second location ($vector_{12}$);
e. at the device, at said second location, recording a time of arrival of said second signal ($TOA_2$), and determining the difference in time of arrival of first and second signals: $DTOA_{12}=TOA_2-TOA_1$;
f. at the device, determining a line of position ($LOP_{12}$) on which said radio beacon is placed, based on: $DTOA_{12}$, $vector_{12}$ and $DTOE_{12}$; wherein said LOP is a hyperbola, defined in a local coordinate system by two foci at both ends of said $vector_{12}$, and $C*|DTOA_{12}-DTOE_{12}|$ been the difference in distances between the beacon and each of said foci, and C is the speed of light.

FIG. 4 depicts LOP on which a beacon is placed drafted indoor based on DTOA. On the X-axis of a 2D Cartesian coordinate system, a mobile device is depicted at two different locations: a first location ($x_1$, $y_1$) and a second location ($x_2$, $y_2$). Somewhere above the X-axis, a beacon is depicted at a location with coordinates (x, y), on the left hyperbola branch, which formula is indicated below, in a rectangular frame, noting that also the right branch of the hyperbola is a valid geometrical representation of said formula. In this formula, actually an equation, $DTOA_{12}$ is the difference in time of arrival of two signals transmitted by the beacon, at a difference in time of emission of $DTOE_{12}$, assuming that a first of these signals arrives at the mobile device while visiting the first location, and a second of these signals arrives at the mobile device while visiting the second location. The distance between said first location and said second location is marked as $vector_{12}$, and it is actually the basis for the local coordinate system X-Y, since the 3D direction of $vector_{12}$ defines the X-axis, and the center of $vector_{12}$ defines the origin point (0, 0) of the local coordinate system. Thus, the Y-axis is perpendicular to $vector_{12}$, and the first location and the second location are equally distanced from the Y axis.

As appreciated by a skilled person, FIG. 4 provides a 2D LOP based on $C*|DTOA-DTOE|$ and $vector_{12}$, which is a hyperbola, while a 3D representation thereof is a hyperboloid.

According to a first embodiment of the present invention, the beacon, is a small battery powered tag attached to an object which geographical position is desired to be determined remotely, such as: person (e.g. dementia/ill/injured person taken care of; soldier or policeman on duty; visitor or employee at a highly secured or dangerous site; athlete participating in competition), animal (wild or domestic), vehicle (e.g. bicycle, car in large parking lot), suitcase or briefcase, personal object (e.g. keys, bags, apparel, small electronic device), goods, mailed/delivered item, weapon or ammunition, toy, to name a few. The mobile device tracking this beacon is preferably a personal mobile device, such as mobile phone, smartphone (iphone or Android), tablet (such as iPad), laptop, etc.

Further according to a first embodiment of the present invention, the beacon comprises a Bluetooth transmitter or transceiver (possibly among other communication capabilities), and the tracking device is Bluetooth enabled, such that Bluetooth signals are used to track the beacon. Furthermore, the Bluetooth transmitter at the beacon is configured to broadcast periodically short signals of Bluetooth advertising, once per 1-2 seconds or so, such that the data packages been sent indicate that no Bluetooth connection is required, enabling a one-way communication between beacon and tracking device. So, the beacon signals are preferably part of a Bluetooth advertising event, and the tracking device is configured to detect Bluetooth advertising event signals, avoiding the need of pairing and connection according to Bluetooth.

FIG. 10 illustrates the beacon signal according to 1st embodiment of the present invention. At the upper side of the picture, three groups of three signals each are depicted by vertical rectangles marked by 37, 38, and 39. Each group of three 37-38-39 signals defines an advertising event according to the Bluetooth standard, wherein the time difference between two consecutive advertising events is marked as advinterval+advDelay. Further down, the time between the start of first and second event is marked as $DTOE_{12}$, and the time between the start of second and third event is marked as $DTOE_{23}$. At the bottom side of the picture, three bullets specify some aspects of the Bluetooth advertising, including:

the frequency of transmission associated with each of the channels 37, 38 and 39;
advinterval timing restrictions;
advDelay timing restrictions.

Further according to a first embodiment of the present invention, the beacon is configured to set the time between consecutive advertising events to a sum of a constant time interval (advinterval) and a pseudo-random time interval (advdelay), wherein advdelay=$m*\Delta t$, m been an integer number with pseudo-random distribution and $\Delta t$ a fixed time duration. Further according to said first embodiment, advinterval=1 s, and advdelay=$m*1$ ms, wherein m is an integer number between 0 to 10, with a pseudo-random distribution. Thus, for example, the $1^{st}$ advertising event can be 1.001 s long, the $2^{nd}$ advertising event can be 1.005 s long, then 1.003 s, 1.009 s, 1.000 s, etc. so following this example and FIG. 10, the time duration of the $1^{st}$ advertising events is $DTOE_{12}=1.001$ s, and the time duration of the $2^{nd}$ advertising events is $DTOE_{23}=1.005$ s.

Then, in the Bluetooth advertising PDU (packet data unit) payload broadcast by the beacon, 1 byte is allocated to report $\Delta t$, in 10 ns resolution, so $\Delta t=1$ ms is represented by 100 [dec]=0110 0100 [bin].

Accordingly, at the tracking device, when for example measuring $DTOA_{12}=1.001000003$ s, and decoding $\Delta t=1$ ms, it is assumed that $DTOE_{12}=1.001$ s, so $|DTOA_{12}-DTOE_{12}|=3$ ns. Accordingly, $C*|DTOA_{12}-DTOE_{12}|=300,000$ Km/s*3 ns=9 m.

Further according to said first embodiment of the present invention, at the tracking device, $vector_{12}$ is determined by an accelerometer measuring the direction and magnitude of the movement between different locations. For example, let's assume that the first and second locations where the first and second signals were monitored, i.e., the two end points of $vector_{12}$, are located on a leveled floor, at 10 m from each other. Then, referring to FIG. 4, the magnitude of $vector_{12}$ is 10 m, and its direction defines the X-axis, on the floor, such that the coordinates of the first position are $(x_1, y_1)=(5, 0)$, the coordinates of the second position are $(x_2, y_2)=(-5, 0)$, and assuming that the beacon is also more or less placed on that floor, at the unknown yet coordinates (x, y), the hyperbola formula is: $\|\sqrt{(x+5)^2+y^2}\|-\|\sqrt{[(x-5)^2+y^2]}\|\|=9$ [m], allowing two branches mirrored over the Y-axis.

Possibly, from time to time, the user may calibrate the accelerometer reading, along a precisely measured 10 m line on the floor. Actually, according to a third embodiment of the present invention, $vector_{12}$ is determined based on a precise line on the ground whose length is precisely measured (e.g., with length measuring tape or laser distance meter), wherein the tracking device is placed on one side of this line (the first location) to monitor a first signal emitted by the beacon, then placed on the other side (second location) of the line, to monitor a second signal emitted by the beacon.

Further according to a first embodiment of the present invention:
a. at the beacon, encoding in each of said signals the transmission power level thereof;
b. at the device, decoding said encoded transmission power level;
c. at the device, measuring the receiving signal strength indication (RSSI) of said signals;
d. at the device, estimating the range between beacon and device, based on said decoded transmission power level and said measured RSSI, and determining a LOP based on RSSI associated with the first signal ($LOP$-$RSSI_1$), and a LOP based on RSSI associated with the second signal ($LOP$-$RSSI_2$);
e. at the device, determining the beacon position, in said local coordinate system, at a crossing point of: $LOP_{12}$, $LOP$-$RSSI_1$, and $LOP$-$RSSI_2$, accounting for measurement inaccuracy.

FIG. 5 shows a method for determining LOP based on DTOA+LOP based on RSSI according to a first embodiment of the present invention. On the X-axis of a 2D Cartesian coordinate system, a mobile device is depicted at two different locations: a first location $(x_1, y_1)$ and a second location $(x_2, y_2)$. The distance between said first location and said second location is marked as $vector_{12}$, and it is actually the basis for the local coordinate system X-Y, since its direction defines the X-axis, while the Y-axis is erected perpendicularly to $vector_{12}$, at its center, such that the first location and the second location have the same distance from the Y axis. Somewhere above the X-axis, a beacon is depicted at a location with coordinates (x, y), on a hyperbola branch, drafted in a wide line, marked as "DTOA LOP selected". At the right side of the Y-axis, another hyperbola branch, drafted in dashed line and marked as "DTOA LOP abandoned". Further, two circles are depicted, representing LOP based on RSSI, one centered at the first location and another centered at the second location, and the circles radii are accordingly marked "range based on RSSI at Pt location" and "range based on RSSI at 2 nd location". The figure shows that the two circles and the selected hyperbola branch ("DTOA LOP selected") have two common points: one is the true position of the beacon, at (x, y), and the other is mirrored over the X-axis, at (x, −y) and marked "another possible resolution of beacon position".

Further according to a first embodiment of the present invention, an additional third signal is emitted by the beacon, detected by the tracking device at a third location, enabling the device determining another LOP, and estimating the position of the beacon.

According to a first embodiment of the present invention, the transmission power level is encoded in [dBm], allocating a single byte in the advertising packet, covering a range between −128 dBm to 127 dBm. So, for example, assuming a transmission power of 10 dBm, and RSSI measurement of −70 dBm, and assuming 0 dB antenna gain at the beacon and tracking device, the path loss is 80 dB; then, considering the Bluetooth frequency of 2.4 GHz, the calculated distance [d] is 100 m, according to the free space path loss (FSPL) formula: (received EIRP−transmitted EIRP)=80 dB=20 log(4 π df/C).

So, with three signals monitored at the tracking device at three different locations, even in the 3D context, three spheres can be defined, having two common crossing points, as a possible resolution of the beacon position. However, the accuracy in determining the radius of these spheres is expected to be poor, particularly since the RSSI cannot distinguish between signal attenuation due to range, and signal attenuation due to obstacles, such as concrete walls, between the beacon and the tracking device. Nevertheless, as shown in FIG. 5, the RSSI measurements could serve to remove the two-branch ambiguity of the hyperbola (2D or hyperboloid (3D).

On the other side, the method of LOP determination based on time measurement disclosed here is much more accurate, since the traveling time of the signal between beacon and tracking device is practically insensitive to such obstacles; furthermore, LOP determination based on time-difference measurement is also practically immune to clock drifting, and oscillator aging, and difference between transmitter clock and receiver clock. So, with 3 beacon signals been monitored at the tracking device, 2 hyperboloids can be defined, in the 3D context, having a LOP in common, while the RSSI measurements can be used to remove the redundant LOP defined by the DTOA measurements. Four such signals already provide a single and accurate resolution of the beacon position.

The searching process can be further improved when the user is moving towards the estimated position of the beacon, as illustrated in FIG. 6.

FIG. 6 illustrates a method for selecting moving direction on LOP based on RSSI. On the X-axis of a 2D Cartesian coordinate system, a mobile device is depicted at two different locations: a first location $(x_1, y_1)$ and a second location $(x_2, y_2)$. Somewhere above the X-axis, a beacon is depicted at a location with coordinates (x, y), on a hyperbola branch at the left side of the Y-axis, marked as "DTOA LOP". A smaller icon of mobile device is shown on the LOP, above the X-axis, from which two dashed line arrows are shown, one upwards and the other downwards the LOP, illustrating two alternative directions of movement on the LOP. Accordingly, text boxes indicate that the upward movement is associated with increasing RSSI measured at the mobile device (since the distance to the beacon becomes shorter), while the downward movement is associated with decreasing RSSI measured at the mobile device (since the distance to the beacon becomes larger).

So, according to a preferred embodiment of the present invention, with 3 signals monitored at three different locations, a LOP can be determined, even in the 3D context, then, the user is prompted to move along this LOP, selecting the right direction according to RSSI (maybe with a short trial-and-error), as illustrated in FIG. 6. In the 2D context, such as when the tracking device moves on a constant level at which the beacon is placed, (e.g., searching for car on parking floor, bicycle at train station, briefcase at specific office floor), the 3 signals provide not only a LOP but actually two specific points on this LOP, at which the beacon could be placed, as illustrated in FIG. 5, then the selection between the two points of FIG. 5, can be done moving along the LOP, as illustrated in FIG. 6.

Further, according to a first embodiment of the present invention, at the tracking device, a LOP is displayed along with the device self-position, and an estimated direction and distance to the beacon, as illustrated in FIG. 7.

FIG. 7 illustrates a Display at mobile device tracking a beacon according to Pt embodiment. A hand-held mobile device is illustrated, on which a dotted curved line is displayed; at the bottom side of this line a person icon is shown, while a beacon icon is shown at the upper side of the line. Asides the dotted line, appears a text indicating the distance and elevation to the beacon.

Such, the user is prompted to approach the beacon moving along the displayed LOP. Obviously, the user may decide to deviate from the displayed LOP, for example due to physical obstacles onsite, then the tracking device is configured to update the LOP and display per FIG. 7, from time to time, upon monitoring further signals periodically emitted by the beacon, and the determining the relative self-position of the tracking device as sensed by the internal accelerometer.

According to a second embodiment of the present invention, the tracking device comprises also a barometric sensor, also known as altimeter, configured to measure the ambient barometric pressure, from time to time. The beacon also comprises a barometric sensor, and is configured to measure the ambient barometric pressure, from time to time, and encode said pressure measurement in the transmitted signal.

So further according to said second embodiment, a byte is allocated at the Bluetooth advertising PDU payload to encode the barometric reading. Actually, to save bit count, the difference from the nominal MSL atmospheric pressure of 1013 mbar (=101.3 KPascal) can be encoded, in [mbar] or in [Pascal] from −128 to +127. Alternatively, an altitude above MSL may be reported instead of air pressure.

As known in the art, there is a mathematical relationship (with some variations) between barometric pressure and altitude above MSL, at same atmospheric conditions. Typically, the altitude calculations are based on the measured pressure (p), the equivalent MSL pressure to compensate for local weather conditions (OFF_H). Pressure [p] is given in Pascals [Pa], altitude [h] given in meters [m], as following:

$$h = 44330.77 \left\{ 1 - \left(\frac{p}{p_0}\right)^{0.1902632} \right\} + \text{OFF\_}H$$

Where: p0=sea level pressure (101,326 Pa);

As known to persons skilled in the art, there are many types of small low power and low-cost pressure sensor chips on the market, by many manufacturers, including: Bosch, ST, NXP, Honeywell. For example, NXP provides MPL3115A2—I2C precision pressure sensor with altimetry, which outputs the air pressure in [Pascal] from 20 to 110 kPa (1000 mbar=100 kPa), and also the altitude (calibrated to a specific MSL air pressure), in [meter], between −698 to 11,775 m.

Typically, these devices obtain a good differential reading, sensing a change of 1-2 meters in elevation.

However, there might be a difference in reading the same air pressure, by different sensors, due to tolerance, drift, aging and other factors, which do not disturb the differential air pressure/altitude reading at the tracking device while moving from point to point, yet could introduce errors when comparing the reading at the beacon to the reading at the tracking device.

To address this potential error source, according to a second embodiment of the present invention, the tracking device is configured to adjust the barometric pressure reported by the beacon, according to an adjustment parameter stored at the tracking device. This adjustment parameter is determined in advance, when the beacon is close to the tracking device (typically administered by the user), and comparing at the tracking device the beacon reported air pressure to its self-measured air pressure.

The barometric or altitude reading can enhance the accuracy of position determination, both of the beacon and tracking device, at the tracking device, as described below.

In FIG. 4, the DTOA LOP is defined in 2D: $\|\sqrt{[(x-x_2)^2+(y-y_2)^2]}\|-\|\sqrt{[(x-x_1)^2+(y-y_1)^2]}\|=C*|DTOA_{12}-DTOE_{12}|$; and representing that in 3D: $\|\sqrt{[(x-x_2)^2+(y-y_2)^2+(z-z_2)^2]}\|-\|\sqrt{[(x-x_1)^2+(y-y_1)^2+(z-z_1)^2]}\|=C*|DTOA_{12}-DTOE_{12}|$;

Then, assuming that X-Y is the floor level on which the tracking device moves, i.e., $z_1=z_2=0$, while the beacon is placed above this floor, i.e., $z>0$, then the 3D DTOA LOP equation is written as: $\|\sqrt{[(x-x_2)^2+(y-y_2)^2+z^2]}\|-\|\sqrt{[(x-x_1)^2+(y-y_1)^2+z^2]}\|=C*|DTOA_{12}-DTOE_{12}|$; wherein z can be estimated at the tracking device based on the difference between barometric pressure at the beacon and at the tracking device, leaving only 2 unknowns (x, y) in the 3D DTOA LOP equation.

For example, if $x_1=5$ m, $x_2=-5$ m, $y_1=y_2=0$, and $|DTOA_{12}-DTOE_{12}|=3$ ns, then the LOP equation is: $\|\sqrt{[(x+5)^2+y^2+z^2]}\|-\|\sqrt{[(x-5)^2+y^2+z^2]}\|=9$; wherein x and y are in [m].

The present invention also discloses a mobile device for tracking a radio beacon, said device comprising: a receiver, an accelerometer (also known as IMU—Inertial Measurement Unit), a controller and a display; said device configured to determine the difference in time of emission ($DTOE_{12}$) between a first signal and a second signal emitted by the beacon, and measure the difference in time of arrival ($DTOA_{12}$) thereof, said first signal arriving while the device is at a first location, and said second signal arriving while the device is at a second location; and measure the distance and direction between said two locations ($vector_{12}$), and determine a line of position ($LOP_{12}$) on which the beacon is placed, based on $DTOA_{12}$, $vector_{12}$ and $DTOE_{12}$; wherein said LOP is a hyperbola, defined in a local coordinate system by two foci at both ends of said $vector_{12}$, and $C*|DTOA_{12}-DTOE_{12}|$ been the difference in distances between the beacon and each of said foci, and wherein C is the speed of light, as illustrated in FIG. 4.

FIG. 9 illustrates a Block Diagram of tracking device according to the present invention. The main block, indicating inside "mobile phone", comprises five inner blocks, from which the center block is marked "Controller", coupled to other four blocks: "Receiver", "display", "accelerometer" and "barometer" (in dashed-line). Further, an antenna is shown coupled to the receiver.

According to a first embodiment of the present invention, the device is a personal mobile phone or tablet, wherein said receiver is a Bluetooth transceiver.

Further according to a first embodiment of the present invention, the accelerometer is a chip accelerometer, for example manufactured by one of: Analog devices, NXP, Bosch, ST, Freescale, particularly: Bosch BMI160—small, low power inertial measurement unit.

Further according to a first embodiment of the present invention, the tracking device is configured to determine $vector_{12}$ using the accelerometer to measure the direction and magnitude of the movement between said first and second locations.

According to a first embodiment of the present invention, the device is configured to decode the transmission power level of the signal, encoded at the beacon, and measure the receiving signal strength indication (RSSI) thereof, and estimate the range between beacon and device, based on said decoded transmission power level and said measured RSSI; and determine a LOP based on RSSI associated with the first signal ($LOP\text{-}RSSI_1$), and a LOP based on RSSI associated with the second signal ($LOP\text{-}RSSI_2$), and determine the beacon position, in said local coordinate system, at a crossing point of: $LOP_{12}$, $LOP\text{-}RSSI_1$, and $LOP\text{-}RSSI_2$, accounting for measurement inaccuracy, as illustrated in FIG. 5.

In a preferred embodiment of the present invention, the tracking device is further configured to detect an additional third signal emitted by the beacon, and determine another LOP, and update the estimated position of the beacon.

Further, according to a first embodiment of the present invention, the tracking device is configured to display the LOP on which the beacon is placed, along with the device self-position, and an estimated direction and distance to the beacon, as illustrated in FIG. 7.

According to a second embodiment of the present invention, the tracking device comprises a barometric pressure sensor, as illustrated in FIG. 9, and configured to measure an ambient barometric pressure, and compare said pressure measurement with at least one of: another pressure measurement made at the device, or a pressure measurement communicated in the beacon signal; and use said pressure comparison to improve the accuracy of LOP, self-position and beacon position, in said local coordinate system.

Further according to a second embodiment of the present invention, the barometer is a small low power and low-cost chip, such as NXP MPL3115A2—I2C precision pressure sensor with altimetry.

The present invention further discloses a radio beacon trackable by a mobile device, said beacon comprising: a transmitter and a controller; said beacon configured to transmit periodic signals, comprising at least a first signal and a second signal, separated in time of emission by $DTOE_{12}$, wherein $DTOE\ 12=n*\Delta t$, n been an integer number and $\Delta t$ a fixed time duration, and encode in the signal its transmission power level, and at least one of: $DTOE_{12}$ or $\Delta t$; enabling at a distanced mobile device decoding said transmission power level, and at least one of: $DTOE_{12}$ or $\Delta t$, and measuring the difference in time of arrival of said signals ($DTOA_{12}$) while the device is placed in two different locations, correspondingly, and further enabling the device measuring the distance and direction between said two different locations (vector$_{12}$); then enabling the device determining and displaying a line of position (LOP$_{12}$) on which the beacon is placed, in a local coordinate system, based on said DTOA$_{12}$, vector$_{12}$, DTOE$_{12}$, and the received signal strength (RSSI) associated with said signal, wherein said LOP is a hyperbola, defined by two foci at both ends of said vector$_{12}$, and C*|DTOA$_{12}$-DTOE$_{12}$| been the difference in distances between the beacon and each of said foci, and C been the speed of light.

FIG. 8 illustrates a Block Diagram of beacon according to the present invention. The main block, indicating inside "Bluetooth system on chip (SOC)", comprising two solid-line blocks, one marked "Controller" and the other marked "Transmitter"; outside the main block, another block is depicted in dashed lines, marked "barometer", which is optional. Further, an antenna is shown coupled to the transmitter. It should be noted that the Bluetooth transmitter is practically a transceiver.

According to a first embodiment of the present invention, the beacon is based on a Bluetooth Low Energy (BLE) system on chip (SOC), as illustrated in FIG. 8. There are many off the shelf Bluetooth SOC on the market (e.g., by TI, Silabs, Nordic, Onsemi, ST), comprising "Controller" and "Transmitter" (practically a transceiver), with free memory onboard enabling Bluetooth stack configuration (for example configuring advertising event parameters, such as advinterval and advdelay) and embedding some application code, as persons skilled in the art are aware of.

So, according to a first embodiment of the present invention, the beacon is a Bluetooth Low Energy device, emitting signals that are part of a Bluetooth advertising event.

Further according to a first embodiment of the present invention, the beacon is configured to perform periodic Bluetooth advertising, as illustrated in FIG. 10, with 1-2 seconds between consecutive advertising events, and specifically configure advinterval with a constant time duration, for example advinterval=1 s, and advdelay=m*1 ms wherein m is an integer number with pseudo-random distribution between 0-10, and encode in the advertising PDU payload: $\Delta t$ and transmission power level.

Also according to said first embodiment, the beacon is further configured to transmit another third signal, encoded with its transmission power level, and $\Delta t$, enabling the device determining at least another LOP, and estimating the position of the beacon.

According to a second embodiment of the present invention, the beacon comprises also a barometric pressure sensor, as illustrated in FIG. 8, and is configured to measure the barometric pressure from time to time, and further encode in the advertising PDU payload also the barometric pressure reading.

Further, according to a second embodiment of the present invention, the beacon further comprises a barometric pressure sensor, as illustrated in FIG. 8, and configured to measure an ambient barometric pressure, and encode said pressure measurement in the signal. The barometer, also known as altimeter, is preferably a small low power and low-cost chip, such as MPL3115A2—I2C precision pressure sensor with altimetry, by NXP.

In many cases, the place of implementation described herein is merely a designer's preference and not a hard requirement. For example, functions disclosed as implemented at the tracking device may alternatively be partially implemented at access points. Given the rapidly declining cost of digital signal processing and other processing functions, it is easily possible, for example, to transfer the processing or a particular function from one of the functional elements described herein to another functional element, such as the so called cloud, without changing the inventive operation of the system.

The invention claimed is:

1. A method for determining a line of position (LOP) on which a radio beacon is placed, at a mobile device, comprising the steps of:
   a. at the radio beacon transmitting periodic signals, comprising at least a first signal and a second signal, configuring the difference in time of emission of said signals as: DTOE$_{12}$=advinterval+m*$\Delta t$, wherein m is an integer number pseudo-randomly generated, advinterval and $\Delta t$ are fixed time durations;
   b. communicating to said device $\Delta t$;
   c. at the device, at a first location, recording a time of arrival of said first signal (TOA$_1$);
   d. moving said device from said first location to a second location, measuring direction and distance from said first location to said second location (vector$_{12}$);
   e. at the device, at said second location, recording a time of arrival of said second signal (TOA$_2$), and determining the difference in time of arrival of first and second signals: DTOA$_{12}$=TOA$_2$-TOA$_1$;
   f. at the device, determining a line of position (LOP$_{12}$) on which said radio beacon is placed, based on: DTOA$_{12}$, vector$_{12}$ and DTOE$_{12}$; wherein said LOP is a hyperbola, defined in a local coordinate system by two foci at both ends of said vector$_{12}$, and C*|DTOA$_{12}$-DTOE$_{12}$| being the difference in distances between the beacon and each of said foci, and C is the speed of light.

2. The method according to claim 1, wherein vector$_{12}$ is determined at the device by an accelerometer measuring the direction and magnitude of the movement between said first and second locations.

3. The method according to claim 1, further comprising the steps of:
   a. at the beacon, encoding in each of said signals the transmission power level thereof;
   b. at the device, decoding said encoded transmission power level;
   c. at the device, measuring the receiving signal strength indication (RSSI) of said signals;
   d. at the device, estimating the range between beacon and device, based on said decoded transmission power level and said measured RSSI, and determining a LOP based on RSSI associated with the first signal (LOP-RSSI$_1$), and a LOP based on RSSI associated with the second signal (LOP-RSSI$_2$);
   e. at the device, determining the beacon position, in said local coordinate system, at a crossing point of: LOP$_{12}$, LOP-RSSI$_1$, and LOP-RSSI$_2$, accounting for measurement inaccuracy.

4. The method according to claim 1, with at least an additional third signal emitted by the beacon, and at the device, determining at least another LOP and estimating the position of the beacon.

5. The method according to claim 1, at the device, further displaying the LOP along with the device self-position, and an estimated direction and distance to the beacon.

6. The method according to claim 1, at the device further measuring an ambient barometric pressure, and comparing said pressure measurement with at least one of: another pressure measurement made at the device, or a pressure measurement encoded in the beacon signal; and using said pressure comparison to improve the accuracy in determining LOP, self-position and beacon position, in said local coordinate system.

7. The method according to claim 6, at the beacon further measuring an ambient barometric pressure, and encoding said pressure measurement in the transmitted signal.

8. The method according to claim 1, said signals being part of a Bluetooth advertising event.

9. A mobile device for tracking a radio beacon, said device comprising:
   a receiver
   an accelerometer
   a controller, and
   a display;
   said device configured to determine the difference in time of emission ($DTOE_{12}$) between a first signal and a second signal emitted by the beacon, and measure the difference in time of arrival ($DTOA_{12}$) thereof, said first signal arriving while the device is at a first location, and said second signal arriving while the device is at a second location; and measure the distance and direction between said two locations ($vector_{12}$), and determine a line of position ($LOP_{12}$) on which the beacon is placed, based on $DTOA_{12}$, $vector_{12}$ and $DTOE_{12}$; wherein said LOP is a hyperbola, defined in a local coordinate system by two foci at both ends of said $vector_{12}$, and $C*|DTOA_{12}-DTOE_{12}|$ being the difference in distances between the beacon and each of said foci, and wherein C is the speed of light; wherein $DTOE_{12}$=advinterval+m*$\Delta$t, m being a pseudo-random integer number, advinterval and $\Delta$t are fixed time durations, and communicating to said device $\Delta$t.

10. The device according to claim 9, configured to determine $vector_{12}$ using the accelerometer to measure the direction and magnitude of the movement between said first and second locations.

11. The device according to claim 9, further configured to decode in said signal the transmission power level thereof, and measure the receiving signal strength indication (RSSI) thereof, and estimate the range between beacon and device, based on said decoded transmission power level and said measured RSSI; and determine a LOP based on RSSI associated with the first signal ($LOP-RSSI_1$), and a LOP based on RSSI associated with the second signal ($LOP-RSSI_2$), and determine the beacon position, in said local coordinate system, at a crossing point of: $LOP_{12}$, $LOP-RSSI_1$, and $LOP-RSSI_2$, accounting for measurement inaccuracy.

12. The device according to claim 9, further configured to:
   detect at least an additional third signal emitted by the beacon, and
   determine at least another LOP, and
   update the estimated position of the beacon.

13. The device according to claim 9, further configured to display the LOP along with the device self-position, and an estimated direction and distance to the beacon.

14. The device according to claim 9, further comprising a barometric pressure sensor, and configured to:
   measure an ambient barometric pressure, and
   compare said pressure measurement with at least one of:
      another pressure measurement made at the device, or a pressure measurement communicated in the beacon signal; and
   use said pressure comparison to improve the accuracy of determined LOP, self-position and beacon position, in said local coordinate system.

15. The device according to claim 9, said signals being part of a Bluetooth advertising event.

16. A radio beacon trackable by a mobile device, said beacon comprising:
   a transmitter, and
   a controller;
   said beacon configured to:
      transmit periodic signals, comprising at least a first signal and a second signal, separated in time of emission by $DTOE_{12}$, wherein $DTOE_{12}$=advinterval+m*$\Delta$t, m being an integer number pseudo-randomly generated, advinterval and $\Delta$t are fixed time durations, encode in the signal its transmission power level, and communicate $\Delta$t to said device;
      enabling at a distanced mobile device decoding said transmission power level, determining $DTOE_{12}$ and measuring the difference in time of arrival of said signals ($DTOA_{12}$) while the device is placed in two different locations, correspondingly, and further enabling the device measuring the distance and direction between said two different locations ($vector_{12}$);
      then enabling the device determining and displaying a line of position ($LOP_{12}$) on which the beacon is placed, in a local coordinate system, based on said $DTOA_{12}$, $vector_{12}$ and $DTOE_{12}$, wherein said $LOP_{12}$ is a hyperbola, defined by two foci at both ends of said $vector_{12}$, and $C*|DTOA_{12}-DTOE_{12}|$ being the difference in distances between the beacon and each of said foci, and C being the speed of light; and
      enabling at said distanced mobile device measuring a Received Signal Strength Indication (RSSI) associated with the beacon transmission, and estimating the range between beacon and device, based on said decoded transmission power level and said measured RSSI and determining a circle LOP-RSSI based on said estimated range, and determining the beacon position, at a crossing point of LOP-RSSI and $LOP_{12}$.

17. The beacon according to claim 16, further configured to transmit at least another third signal, encoded with its transmission power level, wherein DTOE is associated with the third signal and a previously transmitted signal, enabling the device determining at least another LOP, and estimating the position of the beacon.

18. The beacon according to claim 16, further comprising a barometric pressure sensor, and configured to measure an ambient barometric pressure, and encode said pressure measurement in the signal.

19. The beacon accoding to claim 16, said signals being part of a Bluetooth advertising event.

20. The beacon according to claim 19, wherein $DTOE_{12}$ is a time between consecutive Bluetooth advertising events.

* * * * *